April 23, 1940.   R. LAPSLEY ET AL   2,197,938
GEAR SHIFTING MECHANISM
Filed Sept. 12, 1938   2 Sheets-Sheet 1
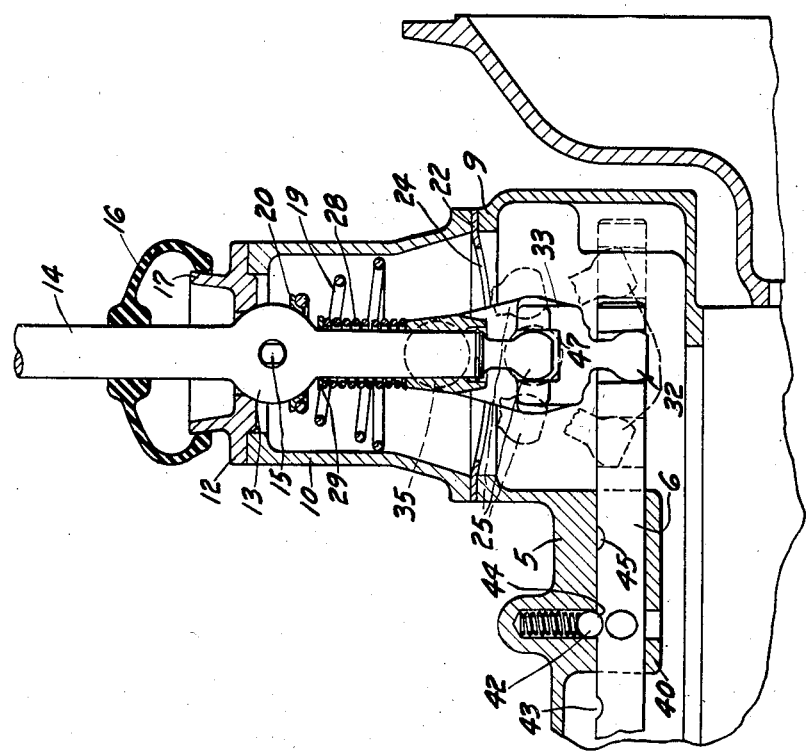
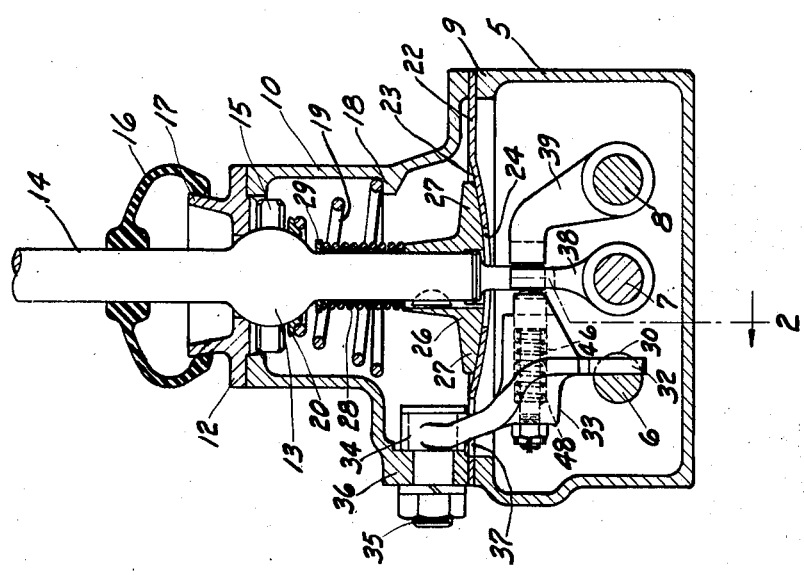
INVENTORS.
ROBERT LAPSLEY & ALBERT F. HASTY.
BY Walter E. Schirmer
ATTORNEY.

April 23, 1940.　　R. LAPSLEY ET AL　　2,197,938
GEAR SHIFTING MECHANISM
Filed Sept. 12, 1938　　2 Sheets-Sheet 2
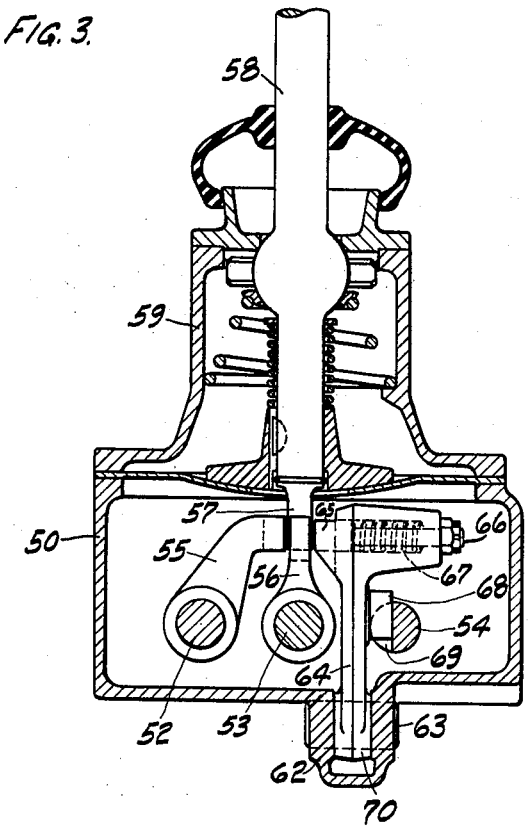
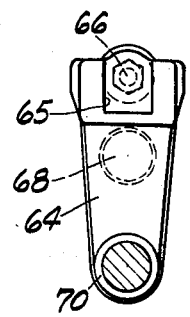
INVENTORS.
ROBERT LAPSLEY & ALBERT F. HASTY.
BY Walter E. Schirmer
ATTORNEY.

Patented Apr. 23, 1940

2,197,938

UNITED STATES PATENT OFFICE 2,197,938

GEAR SHIFTING MECHANISM

Robert Lapsley and Albert F. Hasty, Berrien Springs, Mich., assignors to Clark Equipment Company, Berrien Springs, Mich., a corporation of Michigan Application September 12, 1938, Serial No. 229,408

7 Claims. (Cl. 74—473)

This invention relates to gear shifting mechanism, and more particularly is directed to means for selectively actuating the shift rails of a change speed transmission such as commonly employed in automotive vehicles and the like.

It is a primary object of the present invention to provide a gear shifting construction in which different lengths of gear shifting movement within the transmission are secured without departing from the conventional type of universally mounted gear shift lever.

Another feature of the present invention is the provision of a construction employing a low shift lever tower or pedestal, and yet obtaining a multiplication of the gear shifting movement or a reduction thereof without increasing the length of the lever or the location of the end of the lever with respect to its universal support.

Another object of the present invention is to provide a construction in which the shift lugs for producing the change in rate of movement are relatively small and compact, and may be easily machined.

Still another feature of the present invention resides in the fact that the present construction is flexible in design, thereby permitting variations in the arrangement and disposition of the parts to meet any required combination of gear shifting rails and lengths of movement of the rails.

Heretofore, with the use of a conventional type of gear shift lever having a universal support in a pedestal or the like, the arcuate movement of the lower end of the lever about its support in a gear shifting direction corresponded to the actual linear movement of any of the shift rails and no one of the rails could be moved by the lever a distance either greater or less than any of the other rails without the hand knob moving a corresponding greater or less distance.

In the present invention, means are provided whereby any one of the shift rails may be actuated from any type of conventional shift lever in such a manner as to either increase or decrease its linear movement with reference to the arcuate movement of the lower end of the shift lever. Also, with such a lever, a combination of different movements may be provided whereby the same amount of swinging movement of the gear shift lever will produce a longer movement of one shift rail or shorter movement of another shift rail. By means of these various combinations and arrangements it is easily apparent that with the present construction the restrictions of the design and location of gears in a gear box are, to a great extent, eliminated, and it is therefore possible to provide for many advantageous changes in the transmission due to the advantages of the present shifting construction.

Other objects and advantages of the present invention will appear more fully from the following detailed description which will illustrate to those skilled in the art, in conjunction with the accompanying drawings, the particular construction and operation of the present invention.

In the drawings:

Figure 1 is a transverse vertical sectional view showing a gear shifting mechanism embodying the present invention;

Figure 2 is a sectional view taken substantially along the line 2—2 of Figure 1;

Figure 3 is a sectional view, corresponding to Figure 1, of a modified form of the invention; and Figure 4 is an elevational view of a shift lug such as employed in the construction shown in Figure 3.

Referring now in detail to the drawings, in Figure 1 I have shown the shift rail housing 5 enclosing the three shift rails 6, 7 and 8 mounted for axial shifting movement therein.

Supported on a suitably bossed portion 9 of the housing 5 is a relatively short shift lever tower or pedestal 10 having an inturned flange at its upper end adapted to receive the cap member 12. The cap member 12 is bolted to the top of the housing 10 and has a centrally located substantially semi-spherical socket formed therein adapted to receive the ball portion 13 of a more or less conventional gear shift lever 14. A suitable pin 15 extends through the ball portion 13 of the lever, and its opposite projecting ends are slabbed off for engagement in slotted passageways formed in the depending portion of the cap 12. The peripheral surface of the ball portion 13 coacts with the seating surface in the cap 12 to provide a lubricant seal, and in addition, a suitable rubber closure cap 16 is engaged over the flange 17 on the upper side of the cap to seal the shaft of the lever 14 against escape of lubricant thereby.

The tower 10 is provided with inwardly extending boss portions 18 forming seats for a spirally coiled spring 19 which is biased between the seat portions 18 and a washer 20 bearing against the under side of the ball portion 13 of the lever. This normally maintains the ball portion of the lever in sealing engagement in the socket within the cap 12. Between the housing 5 and the tower 10 there is provided a plate member 22 which is dished in shape, and provided with a central concaved portion 23 having a substantially rectangular slot 24 therein. The lower end of the gear shift lever 14 extends through the slot in the plate, and terminates in a rounded boss portion 25 selectively engageable, upon lateral rocking movement, in the shifting forks to be hereinafter described.

Mounted for sliding movement on the lever 14 is a shoe member 26 which has outwardly flaring wing portions 27 provided with convex surfaces bearing against the upper surface of the dished portion 23 of the plate. The member 26 is normally urged into frictional contact by means of the spring 28 biased between the upper end of the member 26 and cross pin 29 on the lever 14. This maintains the lever in position and prevents possible rattling or vibration thereof when the upper portion of the lever has a relatively long overhang, and even in normal circumstances when travelling over irregular road surfaces.

The gear shift rail 6 is provided with a notched fork portion 30 which is adapted to receive the lower end 32 of a lever 33. The lever 33 is pivotally mounted at its opposite end 34 upon the pivot pin 35 secured to and extending through the boss portion 36 of the tower 10.

The plate 22 is provided with an opening or slot 37 therein through which the lever 33 extends, and which accommodates rocking movement of this lever about the pin 35.

The other shift rails 7 and 8 are provided with conventional shifter forks 38 and 39, respectively, in the embodiment of the invention shown in Figures 1 and 2. Each of the shift rails 6, 7 and 8 is guided for axial sliding movement in a boss portion 40 of the shift rail hosing 9, and suitable detent means 42 is provided for each of the rails to lock them in their respective shifting position by engagement in the notches 43, 44 or 45 of the rails.

With the mechanism disclosed in Figures 1 and 2 the conventional shift lever 14 is adapted to produce a linear movement of the shift rails 7 and 8 substantially equivalent to the distance between the extreme dotted line positions of the portion 25 at the lower end of the shift lever, as shown in Figure 2. The lever 14 necessarily pivots about the center of the pin 15, and consequently moves the shifter forks on the shift rails 7 and 8 a distance equal to the chord of the arc formed by the lower end of the lever in its opposite limiting positions.

However, with the lever 33 engaged at its center, or approximate center, by the lower end 25 of the shift lever it is obvious that a multiplication of movement occurs since a unit movement at the point of engagement of the shift lever 14 with the lever 33 will produce a greater amount of movement at the free lower end of the lever which is connected to the shift rail 6. Consequently, even though the shift lever 14, which is common to all the shift rails, has the same amount of movement for each shifting movement, nevertheless, due to the interposition of the lever 33, the movement of the shift rail 6 in an axial direction will be appreciably greater than the movement of the shift rails 7 or 8.

It is thus apparent that with such a construction, optional movement of the shift rails through different linear distances is possible, and consequently, the transmission can be designed with this in view and without requiring any increase in the height of the shift lever tower. It is also apparent that by varying the point of engagement of the shift lever with the auxiliary lever 33, or by varying the length of the lever 33, the increment of movement can be varied as desired.

Preferably, the lever 33 is provided with a plunger 46 which is normally spring pressed outwardly of the notch 47 in the lever in which the portion 25 of the shift lever 14 is received. The plunger 46 prevents accidental lateral movement of the lower end of the shift lever into engagement with the lever 33, and requires a conscious effort on the part of the operator to effect engagement of the lower end of lever 14 with lever 33. This prevents accidental movement of lever 14 into engagement, and serves to maintain the lever in neutral position and centered in engagement with the shift rail 7. The plunger is normally pressed outwardly by means of the coiled spring 48 disposed within the recess in the lever through which the plunger extends.

Considering now the form of the invention shown in Figure 3, the shift rail housing 50 is somewhat similar to the housing 5 and has mounted therein for axial shifting movement the shift rails 52, 53 and 54. Each of the shift rails 52 and 53 is provided with conventional shifting forks 55 and 56, respectively, which are engaged by the lower end 57 of a conventional type of gear shift lever 58. The lever 58 is mounted within the supporting tower 59 in the same manner as described in connection with Figures 1 and 2, and consequently, no detailed description of this mounting is believed necessary.

The housing 50 is provided with a depending journal portion 62 which has a pin 63 extending therethrough forming a pivot for one end of a reducing lever 64. The lever 64 at its upper end is provided with a forked portion or recess 65 in which the lower end of the shift lever is adapted to engage. This recess is normally closed by means of the plunger 66 which is urged by the spring 67 out into the recess to prevent accidental engagement of the lower end of the shift lever within the recess. However, by a conscious effort on the part of the operator, the lower end of the lever may be swung against the plunger to force the same inwardly, and consequently engage the lower end of the lever in the notch or recess 65. Intermediate its ends the lever 64 is provided with the boss 68 extending laterally therefrom and engageable in a notched-out portion 69 of the shift rail 54. Thus, rocking movement of the lower end 70 which is pivoted about the pin 63 causes the lever 64 to swing in an arc corresponding to the arc of movement of the shift lever 58. However, since the boss 68 is disposed closer to the pivot point 63 than the end of the lever 64, it is apparent that the movement imparted to the shift rail 54 will be less than the movement imparted to the shift rails 52 and 53 by the shift lever 58. Thus, with this arrangement, the effect of the lever 58 is decreased and a smaller shifting movement is produced than the conventional movement effected on the rails 52 and 53. This also in a number of instances is desirable in a transmission design on account of clearances and the like within the transmission case.

In some instances it may be desirable to provide one shift rail with a multiplication of its conventional movement and to provide another shift rail with a decrease from the conventional movement. Under such circumstances, both the levers 33 and 64 may be employed substantially in the manner shown, one of the levers being pivoted beneath the shift rail while the other is pivoted thereabove with one of the levers being of the second class type and one being of the third class type to provide the desired increase or decrease in amount of movement.

It will be obvious that with the present construction no substantial increase in cost is produced due to the fact that the additional shift lever lugs may be formed at low cost and may be easily machined. However, savings in cost of the transmission as a whole may be effected due to the variations allowable in the arrangement of the gears and the shifting clutches controlled by the shift rails mounted for movement in the manner disclosed herein.

We are aware that various changes may be made in certain of the details of construction and design shown herein without departing from the underlying principles of the present invention, and we therefore do not intend to be limited except as defined by the scope and spirit of the appended claims.

We claim:

1. A gear shifting mechanism comprising a plurality of shift rails, a gear shift lever mounted for universal movement above said rails and selectively engageable with certain of said rails for shifting the same, a second lever pivoted at one end above the lower end of said shift lever and engageable at its opposite end below said shift lever with one of said rails, and laterally projecting means intermediate the ends of said second lever engageable by the lower end of said gear shift lever for shifting the associated rail a distance different than the shifting movement imparted to said certain rails by said gear shift lever.

2. In combination, a transmission case having a plurality of parallel shift rails disposed in laterally spaced relation at the top thereof, a gear shift lever mounted above said rails and laterally rockable to selectively engage the lower end thereof with certain of said rails, and motion multiplying means pivoted on said case for swinging movement in a vertical plane and interposed between another of said rails and said end of said lever.

3. In combination, a gear shift lever mounted intermediate its ends for universal movement, a plurality of laterally spaced coplanar shift rails, means on certain of said rails selectively engageable by the lower end of said lever upon lateral rocking thereof for moving said rails axially between predetermined limits upon corresponding fore and aft movement of said lever, a second lever having a fixed pivot at one end and engaging another of said rails at its opposite end, and means intermediate the ends of said second lever engaged by said end of said gear shift lever upon lateral rocking thereof for moving said last-named rail between different limits upon the same fore and aft movement of said gear shift lever.

4. In combination, a gear shift lever mounted intermediate its ends for universal movement, a plurality of laterally spaced coplanar shift rails, means on certain of said rails selectively engageable by the lower end of said lever upon lateral rocking thereof for moving said rails axially between predetermined limits upon corresponding fore and aft movement of said lever, a second lever having a fixed pivot at one end and engaging another of said rails intermediate its ends, and means at the free end of said second lever engaged by said end of said gear shift lever upon lateral rocking thereof for moving said last-named rail between different limits upon the same fore and aft movement of said gear shift lever.

5. In combination, a gear shift lever mounted intermediate its ends for universal movement, a plurality of laterally spaced coplanar shift rails, means on certain of said rails selectively engageable by the lower end of said lever upon lateral rocking thereof for moving said rails axially between predetermined limits upon corresponding fore and aft movement of said lever, a second lever having a fixed pivot at one end and engaging another of said rails at its opposite end, and means on said second lever engaged by said end of said gear shift lever upon lateral rocking thereof for moving said last-named rail between different limits upon the same fore and aft movement of said gear shift lever, said last-named means including a spring controlled plunger normally urging said end of said shift lever out of engagement therewith.

6. The combination, in a transmission case having a gear shift lever supporting tower, a gear shift lever universally supported in said tower, a plurality of coplanar shift rails supported for axial shifting movement in the top of said case, means on certain of said rails directly engageable by the lower end of said lever for imparting axial shifting movement to said rails upon selective fore and aft movement of said lever, and a laterally offset pivotally mounted lever swinging in a vertical plane below said tower having means engaging another of said rails and longitudinally spaced means engageable by the lower end of said gear shift lever for imparting a modified shifting movement to said last-named rail upon the same fore and aft movement of said gear shift lever.

7. A motion modifying shift rail lug adapted to modify the shifting motion imparted by a gear shift lever to a shift rail comprising a lever having a fixed pivot at one end thereof, means on said lever engaging said shift rail at a point spaced from said pivot, and a forked portion on said lever at a point spaced from said last-named means adapted to receive the lower end of the gear shift lever and having a normally directed spring pressed plunger resisting entry of said end of said gear shift lever into said forked portion.

ROBERT LAPSLEY.
ALBERT F. HASTY.